United States Patent [19]

Henderson

[11] 3,896,384

[45] July 22, 1975

[54] DUAL MOUNT ELECTRONIC DEVICE

[75] Inventor: Claude L. Henderson, Camby, Ind.

[73] Assignee: General Aviation Electronics, Inc., Indianapolis, Ind.

[22] Filed: Oct. 5, 1973

[21] Appl. No.: 403,876

[52] U.S. Cl. ............ 325/352; 174/52 R; 174/50.52; 325/356

[51] Int. Cl. ............................................ H04b 1/08

[58] Field of Search ............ 325/119, 310, 352–357, 325/360, 361; 174/50.52, 59, 52 R; 317/99, 101 R, 101 B, 101 C, 101 DH; 312/7 R; 339/17 R; 179/1 PC

[56] References Cited

UNITED STATES PATENTS

| | | | |
|---|---|---|---|
| 2,199,371 | 4/1940 | Goldsmith | 325/352 |
| 3,091,736 | 5/1963 | Germain | 325/355 |
| 3,299,323 | 1/1967 | Dudley | 317/99 |
| 3,300,687 | 1/1967 | Hennessey | 317/101 R |
| 3,500,131 | 3/1970 | Seeley et al. | 174/52 R |
| 3,617,985 | 11/1971 | Kehl | 179/1 PC |

*Primary Examiner*—Benedict V. Safourek
*Assistant Examiner*—Jin F. Ng
*Attorney, Agent, or Firm*—Woodard, Weikart, Emhardt & Naughton

[57] ABSTRACT

An electronic device adaptable for both remote mounting and panel mounting. A detachable connector assembly within the device couples two portions of an electronic circuit together. The portions of the connector assembly may be separated and one portion disposed outside the device available to be coupled to another circuit section remote from the device.

9 Claims, 4 Drawing Figures

PATENTED JUL 22 1975 3,896,384

SHEET 1

DUAL MOUNT ELECTRONIC DEVICE

BACKGROUND OF THE INVENTION

1. Field of the Invention

This invention is in the field of electronic devices with particular electrical connector means.

2. Description of the Prior Art

In the prior art, electronic devices, particularly those used in avionics applications, have been provided in two different packages when a circuit was made available for both panel mounting and remote mounting. The unit for panel mounting would contain indicators such as lights and/or controls, while the unit for remote mounting would contain the basic circuit with a plug or receptacle available to be coupled to a display and/or control section in a panel. Such an approach is costly in production and design because it entails the manufacture of two different units to perform a similar function.

A sectionalized chassis arrangement different from the present invention is disclosed in U.S. Pat. No. 3,059,184 to Germain. Another sectionalized chassis arrangement different from the present invention is illustrated in U.S. Pat. No. 2,731,555 to Beck. The Beck device includes a plug on the end of a chassis available to receive either a receptacle from a cable assembly leading to a remote control panel or a control head. The Germain patent discloses that the control head for an electronic device may be remote from the main unit by using a cord and plug.

SUMMARY OF THE INVENTION

One embodiment of the present invention includes an electronic device adaptable for both remote mounting and panel mounting comprising a package including first and second electronic circuit sections, a connector assembly having a first portion which is coupled to the first circuit section and positioned within the package and having a second portion, and wire means for coupling the second connector portion to the second circuit section and for positioning the second connector portion outside the package when the first and second connector portions are disconnected, the wire means and the second connector portion being positioned inside the package when the first and second connector portions are connected.

An object of the present invention is to provide an electronic device which is adaptable for remote mounting or panel mounting without modifying the chassis of the device.

Another object of the present invention is to provide an electronic device adaptable for remote mounting or panel mounting in which the means for adapting the device are contained within the chassis of the device when it is in the panel mounting mode.

Related objects and advantages of the present invention will be apparent from the following detailed description.

DESCRIPTION OF THE PREFERRED EMBODIMENT

Figure 1:
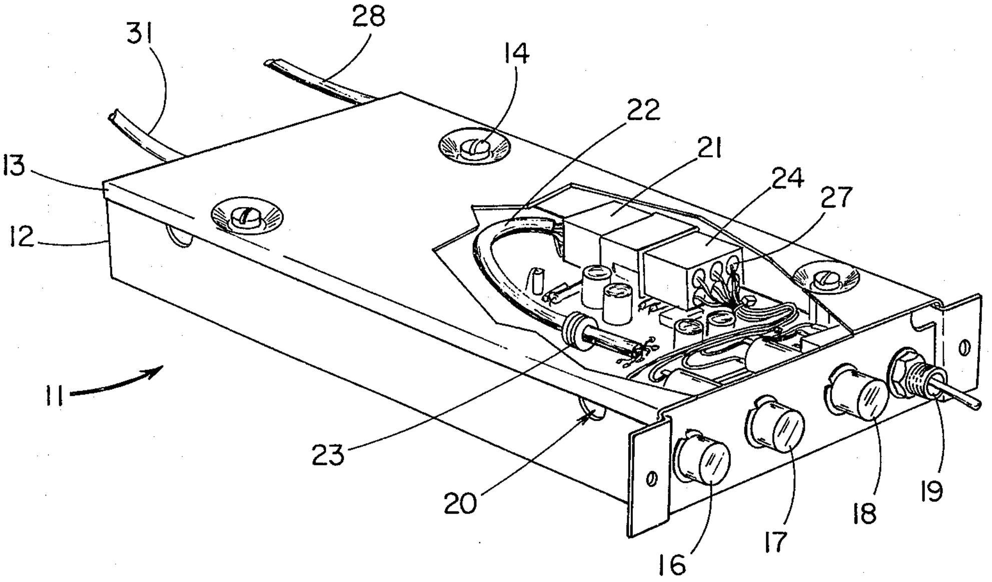
FIG. 1 is a perspective view of an embodiment of the present invention shown in a panel mount arrangement with a portion of the cover removed.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
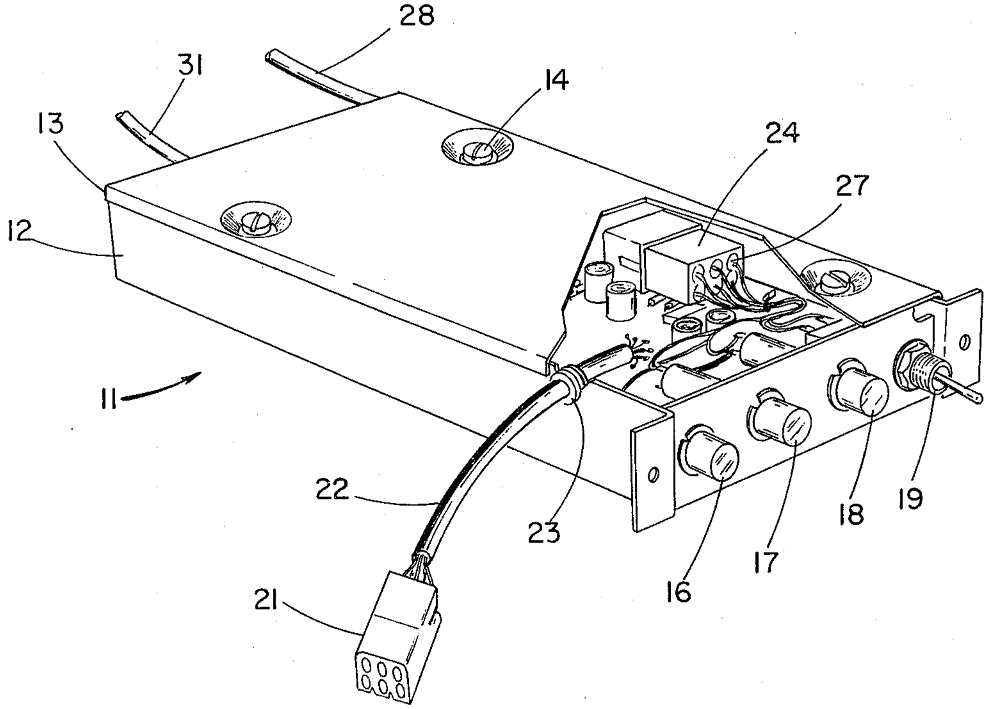
FIG. 2 is a perspective view of the embodiment of FIG. 1 shown in a remote mounting configuration with a portion of the cover removed.

Referring more particularly to FIGS. 1 and 2, there is illustrated a marker beacon receiver package 11 for aircraft embodying the present invention. Package 11 includes a base portion 12 and cover 13 attached to the base portion using conventional fasteners such as screws 14. As shown in FIG. 1, the component layout of the receiver is such that portions 21 and 24 of a connector assembly may be positioned within the package. Connector portion 21 is coupled to connector portion 24 as shown in FIG. 1 when the receiver is set up for panel mounting. Connector portion 21 is coupled to the basic marker beacon receiver circuitry by cable assembly 22. Connector portion 24 is coupled to indicator lights 16 17 and 18 and to switch 19 by six wires such as 27, as shall be described more particularly hereinafter.

Figure 3:
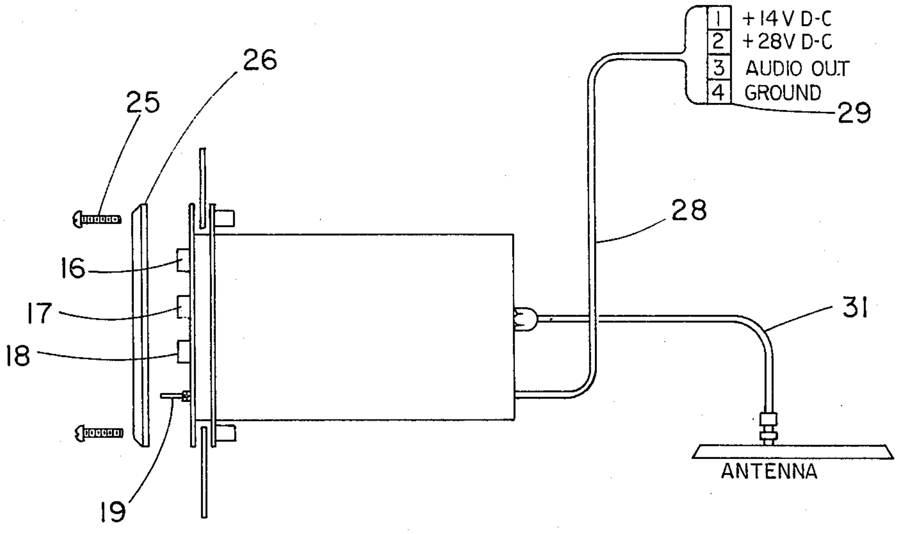
FIG. 3 is a schematic representation of the device as shown in FIG. 1.
Figure 4:
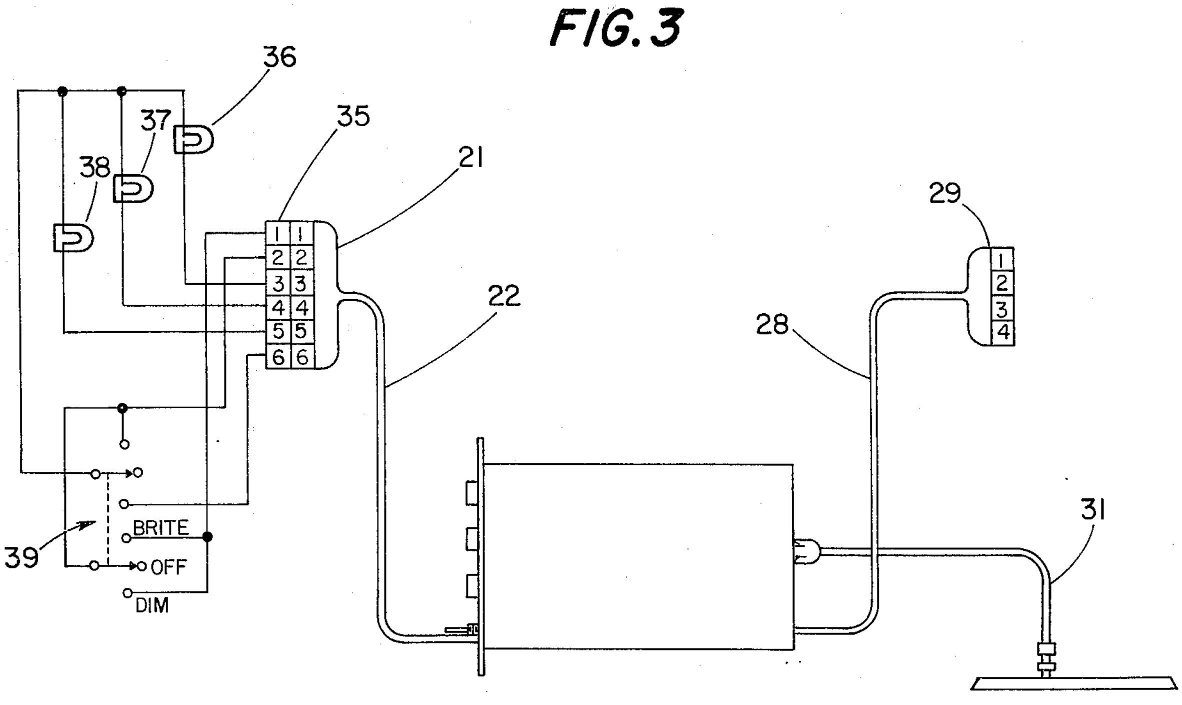
FIG. 4 is a schematic representation of the device as shown in FIG. 2 with the addition of panel components.

As shown in FIGS. 3 and 4, coupled to the marker beacon receiver package 11 are an antenna lead 31 and a power cable 28 which terminates in plug 29. A trim panel 26 is attached over lights 16, 17 and 18 and switch 19, with appropriate holes for the lights and switch, using screws such as 25. The trim panel 26 identifies the functions of the lights and the switch.

As shown more particularly in FIG. 2, connector portion 21 may be positioned outside package 11 for remote mounting of the marker beacon receiver. In order to remote mount the marker beacon receiver package 11, cover 13 is removed from base portion 12 of package 11 and portions 21 and 24 of the connector assembly are separated. Connector portion 24 remains positioned within package 11 and connector portion 21 is moved outside with cable assembly 22 being positioned in opening 20 (FIG. 1) of base portion 12 of package 11. Grommet 23 fits around cable 22 in opening 20 to protect the cable from being cut by an edge of base portion 12 or cover 13. Cover 13 of package 11 is then reattached. Lights 16, 17 and 18 and switch 19 are no longer coupled to the base marker beacon receiver circuitry but terminate at connector portion 24. The package 11, in this remote mount mode, may now be mounted in any convenient location in an aircraft. As shown schematically in FIG. 4, connector 21 may now be coupled to connector portion 35 which is connected to a set of lights and a switch mounted in the aircraft control panel. Lights 36, 37 and 38 and switch 39 are analogous to lights 16, 17 and 18 and switch 19, respectively. Lights 16, 17 and 18 and switch 19 are wires to connector portion 24 in the same manner that lights 36, 37 and 38 and switch 39 are wired to connector portion 35 (FIG. 4). Thereby connector portion 21 may couple the basic marker beacon circuitry to either set of lights and switch through connector portion 24 or connector portion 35.

Lamps 16 and 36, 17 and 37, and 18 and 38 indicate Fan/Z, Outer, and Middle markers, respectively. Switches 19 and 39 are off-bright-dim selectors for the lights. These functions are indicated on trim panel 26 (FIG. 3).

It can be seen from the preceding description that an electronic device has been provided which is adaptable for either remote mounting or panel mounting without the need for modifying the chassis of the device.

It is further apparent that an electronic device has been provided which is adaptable for remote mounting or panel mounting in which the means for adapting the device are contained within the device package when it is in the panel-mount mode.

While there have been described above the principles of this invention in connection with specific apparatus, it is to be clearly understood that this description is made only by way of example and not as a limitation in the scope of the invention.

The invention claimed is:

1. An electronic device adaptable for both remote mounting and panel mounting comprising:
  - a package having an aperture including first and second electronic circuit sections;
  - a connector assembly having a first portion which is coupled to the first circuit section and positioned within the package and having a second portion; and
  - wire means for coupling the second connector portion to the second circuit section and for positioning the second connector portion outside the package when the first and second connector portions are disconnected, the wire means and the second connector portion being positioned inside the package through said aperture when the first and second connector portions are connected.

2. The device of claim 1 in which the package includes a base portion containing the first and second electronic circuit sections and a cover portion detachable from the base portion, the cover portion and base portion defining said aperture when they are mounted together.

3. The device of claim 2 in which the first circuit section includes control means for controlling the operation of the second circuit section.

4. The device of claim 2 in which the first circuit section includes indicator means for displaying information coupled from the second circuit section.

5. The device of claim 4 in which the first and second electronic circuit sections comprise an avionics marker beacon receiver.

6. An electronic circuit apparatus adaptable for both remote mounting and panel mounting comprising:
  - a package, including therein an electronic circuit portion and an indicator portion, the package further including an aperture therethrough communicating from the exterior of the package to the interior of the package;
  - a connector assembly having a first connector within the package coupled from the indicator portion and having a second connector which may be coupled to the first connector;
  - a cable coupling the electronic circuit portion to the second connector, the cable extending from the electronic circuit portion through the aperture in the package to the second connector at a location exterior of the package, whereby the electronic circuit portion may be coupled through the cable and the connector assembly to the indicator portion or through the cable and the second connector to the location of the second connector external to the package.

7. The apparatus of claim 6 which further comprises a second indicator portion remote from the package coupled to the second connector.

8. The apparatus of claim 7 in which the first and second indicator portions each comprise a plurality of indicator lights.

9. The apparatus of claim 8 in which the package includes a base containing the electronic circuit portion and the indicator portion and a cover detachable from the base, the cover and the base defining the aperture through which the cable extends when the base of the cover are mounted together.

* * * * *

UNITED STATES PATENT AND TRADEMARK OFFICE

CERTIFICATE OF CORRECTION

PATENT NO. : 3,896,384

DATED : July 22, 1975

INVENTOR(S) : Claude L. Henderson

It is certified that error appears in the above-identified patent and that said Letters Patent are hereby corrected as shown below:

In Column 2, line 66 change "wires" to "wired".

In Column 3, line 36 between "package" and "when" insert --through said aperture--.

In Column 3, line 39, "through said aperture" should be canceled.

Signed and Sealed this

*twenty-fifth* Day of *November 1975*

[SEAL]

*Attest:*

RUTH C. MASON
*Attesting Officer*

C. MARSHALL DANN
*Commissioner of Patents and Trademarks*